(12) United States Patent
Baskaran et al.

(10) Patent No.: US 9,032,452 B2
(45) Date of Patent: May 12, 2015

(54) METHOD AND APPARATUS FOR SIMULATING HEAD-END CONNECTIVITY ON A SET-TOP BOX

(75) Inventors: Arjun Baskaran, Chennai (IN); Padmakumar Rajan, Chennai (IN); Mariappan Chellam, Chennai (IN); Brian E. Bond, Fairmont, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 443 days.

(21) Appl. No.: 13/173,504

(22) Filed: Jun. 30, 2011

(65) Prior Publication Data

US 2013/0007813 A1    Jan. 3, 2013

(51) Int. Cl.
| | | |
|---|---|---|
| *H04N 5/455* | (2006.01) |
| *G06F 13/00* | (2006.01) |
| *H04N 7/173* | (2011.01) |
| *H04N 7/18* | (2006.01) |
| *H04N 21/258* | (2011.01) |
| *H04N 21/27* | (2011.01) |
| *H04N 21/266* | (2011.01) |
| *H04N 21/222* | (2011.01) |
| *H04N 21/2362* | (2011.01) |
| *H04N 21/242* | (2011.01) |
| *H04N 21/442* | (2011.01) |
| *H04N 21/472* | (2011.01) |

(52) U.S. Cl.
CPC ......... *H04N 21/25866* (2013.01); *H04N 21/27* (2013.01); *H04N 21/266* (2013.01); *H04N 21/2221* (2013.01); *H04N 21/2362* (2013.01); *H04N 21/242* (2013.01); *H04N 21/44209* (2013.01); *H04N 21/472* (2013.01)

(58) Field of Classification Search
USPC ........... 725/38–62, 74, 80–85, 109, 110, 112, 725/114, 119, 120, 123
See application file for complete search history.

(56) References Cited

U.S. PATENT DOCUMENTS

| | | | | |
|---|---|---|---|---|
| 6,671,883 | B1* | 12/2003 | Rahman | 725/123 |
| 7,065,778 | B1* | 6/2006 | Lu | 725/98 |
| 8,332,905 | B2* | 12/2012 | Jenkin et al. | 725/151 |
| 2003/0140343 | A1* | 7/2003 | Falvo et al. | 725/51 |
| 2006/0167903 | A1* | 7/2006 | Smith et al. | 707/100 |

* cited by examiner

*Primary Examiner* — Pankaj Kumar
*Assistant Examiner* — Alazar Tilahun

(57) ABSTRACT

An approach is provided for simulating a connection to a head-end system to enable execution of content and features of a set-top box. A simulation platform stores a plurality of control data signals associated with a head-end system. In response to a determined loss of connectivity to the head-end system, the platform invokes a head-end simulation process using the control data signals, including timing information, dynamic data and channel map data.

19 Claims, 10 Drawing Sheets

100

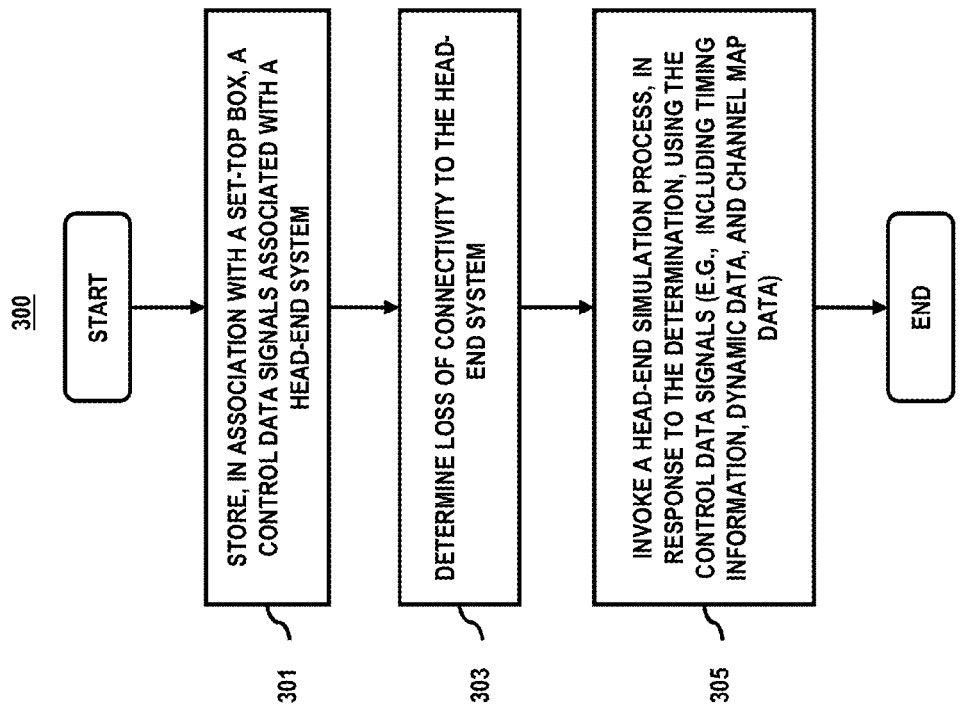

900

METHOD AND APPARATUS FOR SIMULATING HEAD-END CONNECTIVITY ON A SET-TOP BOX

BACKGROUND INFORMATION

A head-end is a facility featuring equipment for receiving television signals, processing them and feeding them for distribution over a television network. Cable television service providers receive the signals and distribute them to subscribers in the form of one or more channels. Typically, set-top boxes (STBs) are configured at the residence, business or other location of the subscriber to enable playback of content via the one or more channels. Unfortunately, when connectivity to the head-end system is lost for any reason, users are not able to access on-demand access to scheduled programming via the channels, use interactive widgets, play games or perform other normal functions of the STB.

Therefore, there is a need for an approach to effectively address the loss of head-end connectivity.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3D are flowcharts of processes for simulating a connection to a head-end system to enable execution of content and features of a set-top box, according to various embodiments;

DESCRIPTION OF THE PREFERRED EMBODIMENT

A preferred apparatus, method, and software for simulating a connection to a head-end system to enable execution of content and features of a set-top box are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE).

Figure 1:
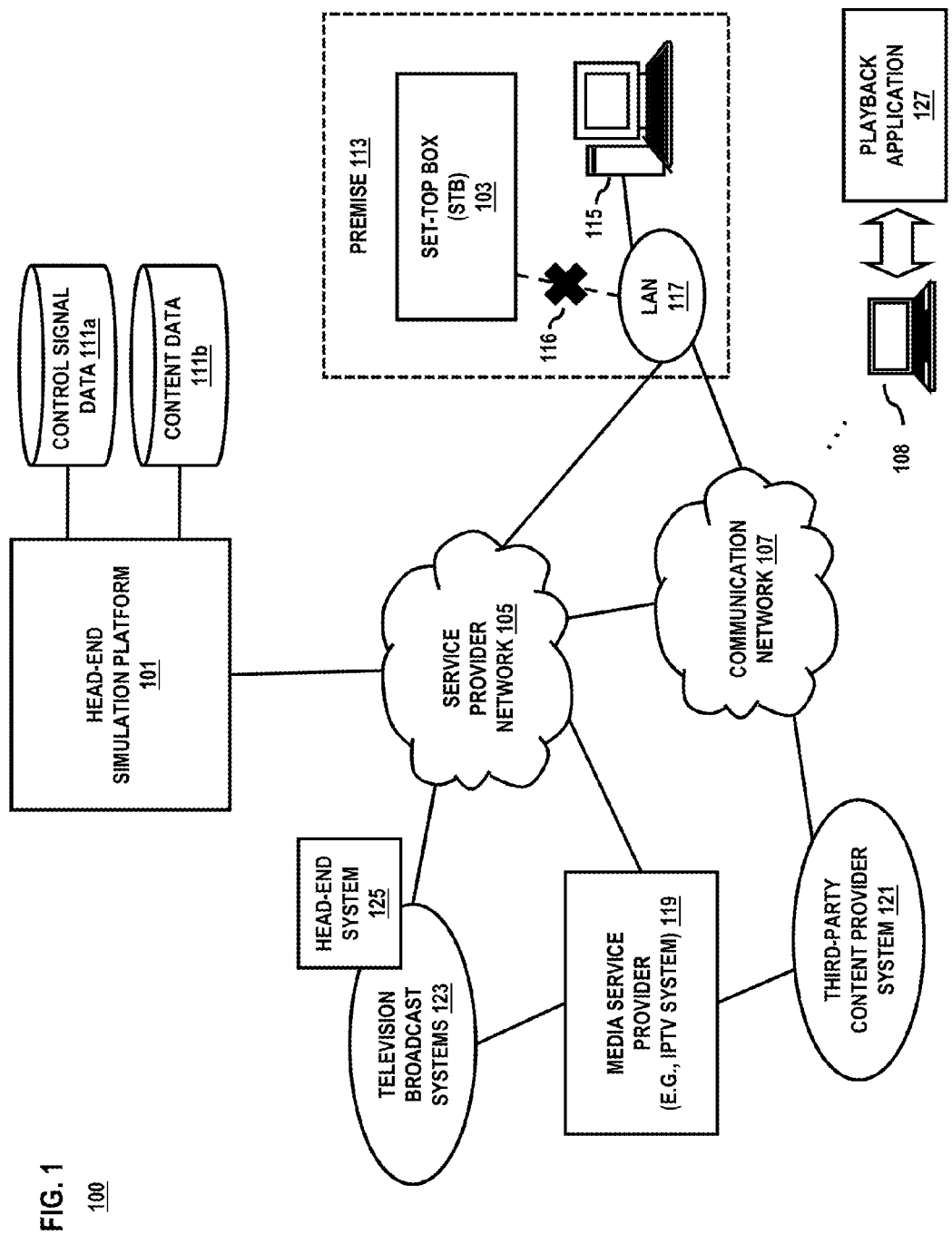
FIG. 1 is a diagram of a system capable of simulating a connection to a head-end system to enable execution of content and features of a set-top box, according to one embodiment.

FIG. 1 is a diagram of a system capable of simulating a connection to a head-end system to enable execution of content and features of a set-top box, according to an exemplary embodiment. For the purpose of illustration, system 100 is described with respect to a simulation platform 101 that is configured to interface with set-top boxes (STBs) 103 and other devices 113 associated with a user (e.g., a viewer) through a service provider network 105 and/or communication network 107. A set-top box includes, for example, a device that connects to a television, media player, etc., and an external source of signal (e.g., media service provider 119), turning the signal into content which is then displayed on the television screen or other display device. Set-top boxes process signals for presenting audio-visual content (e.g., broadcast television programs, Video On Demand (VOD) programs, pay-per-view programs, Internet Protocol television (IPTV) feeds, DVD related content, etc.), pre-recorded content data, data communication services content (e.g., commercials, advertisements, videos, movies, songs, images, sounds, etc.), Internet services content (streamed audio, video, or image media), and/or any other equivalent media form.

In this manner, media service provider (MSP) 119 may provide (in addition to their own media) content obtained from sources, such as one or more third-party content provider systems 121, one or more television broadcast systems 123, etc., as well as content available via one or more communication networks 107, etc. In addition, the content may include television programming for presentment via one or more channels at varying times. The content is provided to the set-top box by way of a head-end system 125, which processes video signals for distribution into the television broadcast system 123. Control signals are also generated and transmitted by the head-end system to enable set-top box connectivity. A variety of equipment is used at the head-end system 125 for supporting content and control signal generation and transport, including antennas and satellite dishes to receive signals, preamplifiers, frequency converters, demodulators and modulators, processors, and scrambling and de-scrambling equipment.

It is observed that television remains the prevalent global medium for entertainment and information as individuals spend a great deal of time tuning into both public television programs as well as paid televised media (e.g., cable television). Set-top boxes are often configured for use with television displays, home entertainment systems and media processing equipment to enable viewers to receive, tune and even interact with or manipulate television content. Capabilities supported may include enabling the selection of specific programs and channels, the playing games, the activation of various widgets (e.g., an interactive clock), etc. However, the set-top box does not function without its connection to the head-end system. A connection may be lost, for example, due to a faulty coaxial cable or improper configuring of the set-top box to the service provider network 105. When connectivity loss occurs, the user cannot enjoy the benefits of the STB.

Thus, the approach of system 100 is configured to enable viewers to access content and execute the various features of the set-top box 103 regardless of the level of connectivity to the head-end system 125. By way of example, a simulation platform 101 operates in connection with the set-top box 103 to generate the necessary control signals for simulating connectivity between the STB 103 and the head-end system 125. As such, when a lost connection 116 between the STB 103 and the head-end system 125 occurs for any reason, the viewer is still permitted to access television programs and broadcasts through the various channels, load program guide data, execute video-on-demand, operate widgets and perform other enhanced features. The simulation platform 101 simulates (mimics) the STB 103 to head-end 125 connectivity by providing various control data signals 111a for indicating a connection. These control signals may include, for example, timing information, dynamic data, and channel map data; all of which are required to enable the playback of content data 111b as received during an instance of an actual connection to the head-end system 125.

In certain embodiments, the simulation platform 101 operates in connection with the STB 103 to persistently store (e.g., cache) the various control data signals 111a and associated content data 111b during a period of connectivity. For example, when the coaxial cable connected to the STB 103 for detecting and receiving head-end signals is active, the platform 101 caches the control signal data and associated content to data store 111a and 111b respectively, which are accessible to the platform 101 and thus the STB 103. The content data 111b as stored includes past content data, future content data, or both, while the various control data signals 111a correspond to the content data 111b accordingly. Storage may be performed on a scheduled basis, such as whenever a connection is available or at a predetermined frequency—i.e., once per day. In addition, the platform 101 may be configured to cache content data 111b up to a specific duration in time and/or up to a specific buffer amount. Hence, the designated time period or specified buffer may enable 24 hours worth of past or future content data to be stored from the time of head-end access. It is noted that the configuration settings may correspond to a factory, manufacturer, service provider or television broadcast provider defaults, one or more user settings, or a combination thereof.

Per the caching execution of platform 101 during connectivity, the STB 103 may access the following information from the head-end: Timing information, Channel Map Data, and Dynamic Data. In one embodiment, timing information includes data for indicating a last recorded time of accessing of the head-end control data signals. Hence, the control data signals are stored and time stamped accordingly during periods of scheduled caching (storing) when STB 103 to head-end connectivity is active.

Channel Map Data, in one embodiment, includes data for indicating which programs/content correspond to which channel. The channel map data may also specify programming data for indicating a scheduled time of play of content data 111b. For example, the scheduled time data may be used to segment the channel map into programs/content intended for different time slots. One program may be scheduled to occur, for example, at 3 pm-4 pm, while another is set for the 4 pm-5 pm time slot. Hence, the platform 101 utilizes channel map data to map specific content data 111b to the organized scheduled time data accordingly. In addition, the platform analyzes the scheduled time data against current time data, the available timing information, or a combination thereof in order to regulate playback of the recorded content data relative to real-time conditions. Hence, depending on the current time and the timing information, content corresponding to the scheduled time slot is accessed.

According to one embodiment, Dynamic Data include information that is asynchronously changed as further updates to the content data (e.g., metadata), channel map data, and other information becomes available. Updates in data may occur at any time, with periods of inactivity in between, as the content data 111b is being cached. By way of example, the dynamic data may include program changes as indicated by the television broadcast system provider (e.g., cable television provider) or media service provider 119 for affecting configuration of the channel map data. As another example, the dynamic data may be cached for supporting on-demand execution of widgets, games and content-based features via the STB, etc. Under this approach, dynamic data is therefore made available in the form of input provided by the user/viewer during execution of a widget or any other interaction with the various features of the STB 103. This includes instances where the user selects a particular action button, enters a text string, activates a dynamic web link directly from content data 111b, places a call, etc.

Concurrent with the storing of the above described control data signals to data store 111a, the platform 101 also records the associated content data 111b. The content data 111b may be cached, for example, as quadrature amplitude modulation (QAM) content, a common data format used by cable television providers and the like for encoding and transmitting content. As described above, the content data 111b is mapped to a specific channel via the channel map data, for playback on demand or upon accessing of a particular channel based on the specified time as live television content. Also, in certain embodiments, content data 111b may include graphic primitives, textual data, executable data and configuration data required for supporting the operation of widgets and other features of the STB 103. By way of example, this may include one or more menus, buttons, text boxes, icons, control panels, screen-in-screen controls, instructions, digital media, games, social networking utilities, sounds, and other content that is invoked or processed in connection with the various features of the STB 103.

It is noted that the channel map data, timing information and dynamic data may be used to indicate the specific content data required to be retrieved and subsequently stored relative to a given user profile. For example, a user having a platinum package according to their service contract may have access to more channels and thus content data 111b, requiring retrieval of more content as specified by the channel map data. Alternatively, a user having a basic package may have access to only limited content data 111b as specified for retrieval via the channel map data.

Storing of the above described control signal data 111a in conjunction with content data 111b enables playback of the content, on demand, regardless of a loss of connectivity 116 of the STB 103 to the head-end system 125. When a connection is determined to fail, i.e., connection 116, the content data 111b as stored may be played back as television programming or executed in real-time for supporting STB 103 functionality without direct connect to the head-end system 125. In certain embodiments, the simulation platform 101 also supports remote or "on-the-go" execution of STB 103 functionality from one or more user devices, whether the devices are located inside the user premise 113 or outside. For example, the platform 101 may interact with a mobile device 108 belonging to the user/viewer that is configured to access the control signal data 111a and content data 111b as stored by way of a playback application 127. The playback application 127 may be a media player, television broadcast software or any other like utility having the appropriate application programming interfaces (APIs) for accessing the simulation platform 101, enabling the execution of content data 111b and invoking the various features of the STB 103. Per this execution, in response to a request for access to particular content or execution of an STB feature (e.g., activation of a game), the data 111a and 111b from the platform 101 as stored is provided to the playback application 127 at the wireless device 108. Under this scenario, the playback application 127 may be configured to support on-demand, remote accessibility to the functions and features of the STB 103 by way of a communication network 107. In addition, the playback application 127 supports access to content and STB features with or without direct access to the head-end system 125.

It is noted that user devices 108 or 115 may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the devices 108 and 115 can support any type of interface for supporting the presentment or exchanging of data, including content related to the STB 103. Still further, user devices 108 and 115 may facilitate various input means for receiving and generating information, including touch screen capability, keyboard and keypad data entry, voice-based input mechanisms and the like. Any known and future implementations of user devices for supporting access to a communication network 107 are applicable.

Communication network 107 can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G or 4G wireless broadband networks, mobile television networks, radio networks, etc.), terrestrial broadcasting networks, provider specific networks (e.g., fiber optic networks, cable networks, etc), and the like. Such networks may also utilize any suitable protocol supportive of data communications, e.g., transmission control protocol (TCP), internet protocol (IP), file transfer protocol (FTP), telnet, hypertext transfer protocol (HTTP), hypertext transfer protocol secure (HTTPS), asynchronous transfer mode (ATM), socket connections, Ethernet, frame relay, and the like, to connect set-top boxes 103 to various sources of content data, such as one or more third-party content provider systems 111. Although depicted in FIG. 1 as separate networks, communication network 107 may be completely or partially contained within service provider network 105. For example, service provider network 105 may include facilities to provide for transport of packet-based communications.

According to certain embodiments, devices at a premise 113 may also be configured to communicate over one or more local area networks (LANs) 117 corresponding to the user (e.g., viewer). In this manner, routers (not shown) may be used for establishing and operating, or at least connecting to, a network such as a "home" network or LAN 117, and is used to route communications among various interconnected devices 113. For example, set-top box 103 may be communicatively coupled to LAN 117 via a router and a coaxial cable, whereas devices 115, 108 and 106 may be connected to LAN 117 via a router and a wireless connection, a network cable (e.g., Ethernet cable), and/or the like. It is noted, however, that in certain embodiments set-top box 103 may be configured to establish connectivity with LAN 117 via one or more wireless connections. A determined loss of connectivity between the set-top box 103 and the LAN 117, illustrated as lost connection 116, may trigger the invoking of the above described head-end simulation process. Further, set-top box 103, wireless device 108 and computing device 115 may be uniquely identified by LAN 117 via any suitable addressing scheme. For example, LAN 117 may utilize the dynamic host configuration protocol (DHCP) to dynamically assign "private" DHCP internet protocol (IP) addresses to set-top box 103 and devices 113 and 108, i.e., IP addresses that are accessible to the devices that are part of the LAN 117 facilitated via a router.

Figure 2:
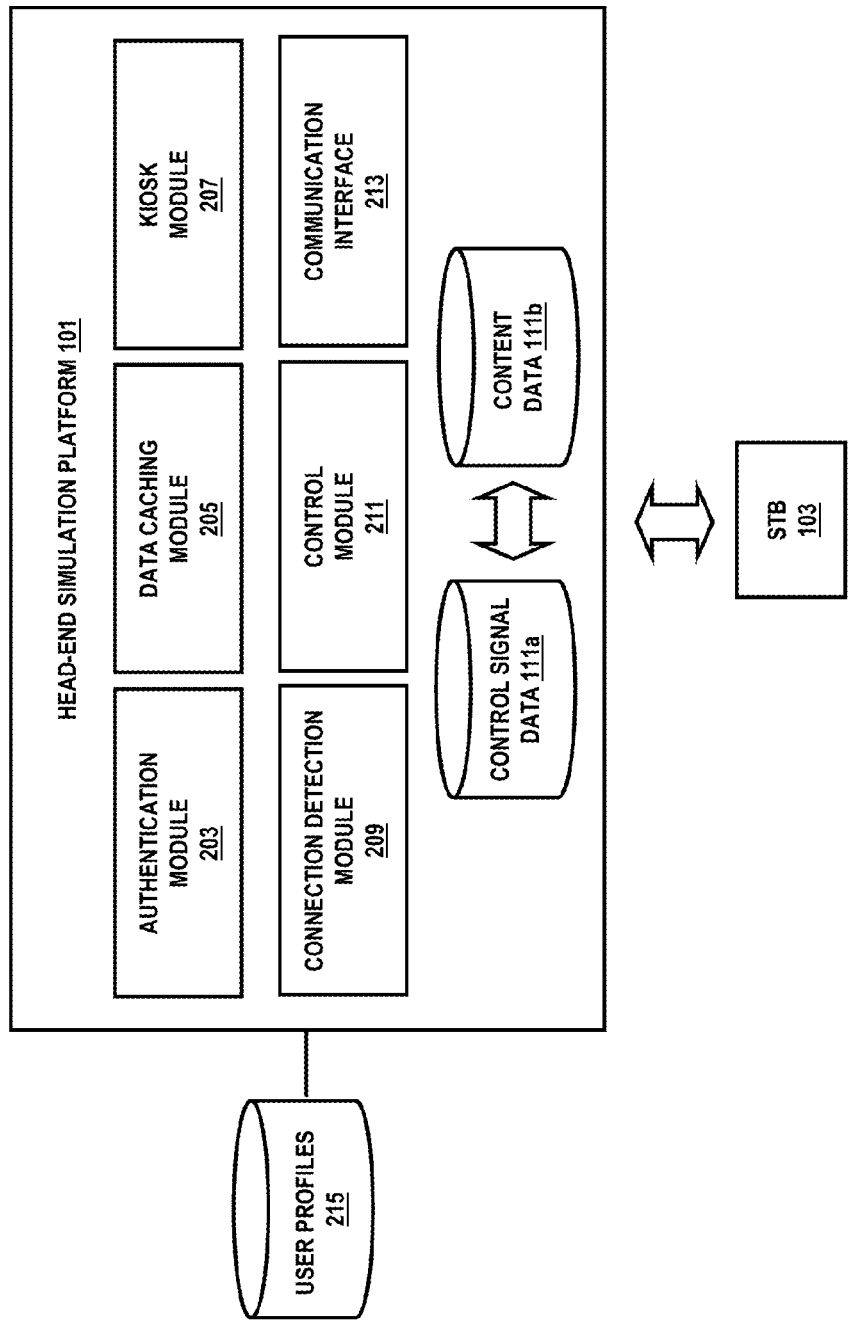
FIG. 2 is a diagram of a simulation platform, according to one embodiment.
Figure 3D:
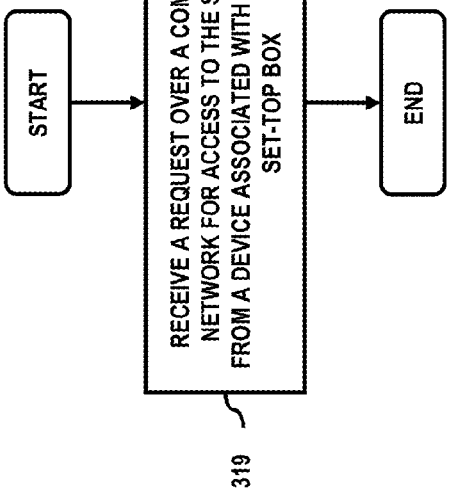
Figure 3C:
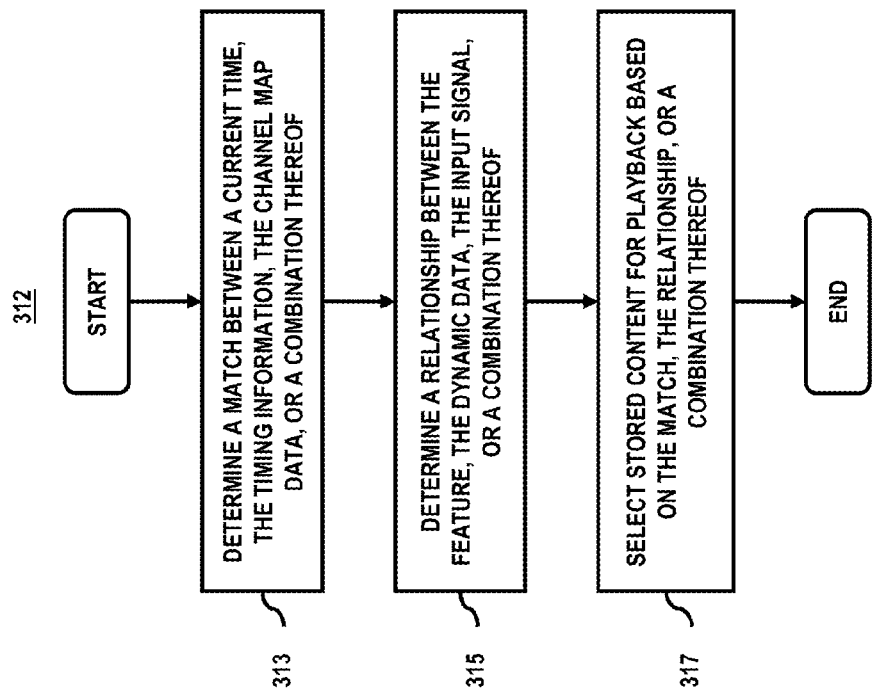

FIG. 2 is a diagram of a simulation platform, according to one embodiment. The simulation platform (or platform) 101 may comprise computing hardware (such as described with respect to FIG. 6), as well as include one or more components configured to execute the processes described herein for simulating a connection to a head-end system to enable execution of content and features of a set-top box. In one implementation, platform 101 includes an authentication module 203, data caching module 205, kiosk module 207, connection detection module 209, control module 211 and communication interface 213. In addition, the correlation platform 101 also maintains user profile data 215, control signal data 111a and content data 111b.

By way of example, the user profile data 215 may include data for identifying the user and/or viewer of content provided by a set-top box. Thus, the user profile data 215 may include data specifying the name, address and other contact details of the user along with a unique identifier of the user. In addition, the profile may indicate a specific content package and available programming features associated with a given user (e.g., platinum level user versus premium channel user). Still further, the user profile data 215 specifies the one or more user devices 113 that are able to access the simulation platform 101 for on-the-go access to the capabilities of the STB 103. For example, the user may specify that a wireless enabled laptop 108 be given permission to connect to the platform 101 and thus access any control signal data 111a and content data 111b available to the STB 103.

In certain embodiments, the authentication module 203 enables the maintenance of the above described user profile data 215 as well as the handling of initial registration requests. Registration requests may be handled by the authentication module 203 pursuant to a subscription arrangement between a user of the STB 103 and a provider of the platform 101 (e.g., a communication services provider or television broadcast service provider). In addition to initial registration management, the authentication module 203 may also operate in connection with a communication interface 213 to detect the receipt of requests for operation of the STB 103 in accordance with a head-end simulation mode. Requests may be received from one or more registered devices, in connection with a profile, by a device within the user premise 113 or externally located (e.g., laptop 108 of FIG. 1).

In certain embodiments, the data caching module 205 retrieves the various control signal data 111a as well as content data 111b required for simulating a connection of the STB 103 to a head-end system. The data caching module 205 first detects the presence of the head-end by way of various connectors at the STB 103. A connection detection module 209 may enable dielectric connectivity detection, control signal data transfer verification, etc, for detecting the presence of the proper control signal data 111a. When the required control signals are detected, a determination is made that connectivity to the head-end is active, and the control signal data 111a is stored as control signal data 111a. In addition, content data 111b is stored during the time of connection to the head-end. For certain implementations, the control signal data 111a and content data 111b are cached to support immediate access to the data required for simulated playback execution. It is noted, however, that the data caching module 205 may further support the storing of data 111a and 111b to a permanent memory location, such as for the building of a video library, maintenance of a certain reached level of a game, storing of notes, bookmarks or links as generated by a user, or other storage requirements.

The data caching module 205 retrieves data 111a and 111b on a predetermined basis. For example, the module 205 may be set to retrieve data n number of times per day upon detection of an active connection, only upon initial boot-up or activation of the STB 103 or at other intervals. In addition, the amount of data 111a and 111b to be consumed during the time of detected STB 103 to head-end connectivity is predetermined. For example, the user profile 215 may indicate the size of the content data buffer to be maintained. Alternatively, the profile 215 may indicate a specific amount of programming to be cached. In the latter scenario, for instance, the user profile 215 may specify 24 hours worth of programming is to be cached, thus enabling the user to store the prior/or forward 24 hours worth of content. Control data signals 111a, including timing information, channel map data and dynamic data are also stored in association with the content data 111b during periods of determined head-end connectivity. It is noted that the frequency of data retrieval and rate of data consumption may also be set by the television broadcast system provider, communication service provider, or the like.

In certain embodiments, the kiosk module 207 invokes a head-end simulation process in response to: (1) a determined loss of connectivity between the STB 103 and the head-end system, as determined by a connection detection module 209; (2) a request for access to the features and functions of the STB 103 by a remote device (on-the-go execution), as determined by the authentication module 203 in conjunction with a communication interface 213; or a combination thereof. By way of example, when a sudden loss of connectivity is determined, the kiosk module 207 retrieves the stored control signal data 111a and presents it to the STB 103. Upon receipt of this data 111a, execution of the STB 103 is permitted; the control data signals 111 being sufficient for indicating a presence of the head-end with respect to the STB 103.

As a result of the simulated connectivity (head-end simulation process), the user is provides access content data 111b, albeit on a limited basis, despite the determined lack of connection of the STB 103 to the head-end system. Hence, the kiosk module 207 facilitates playback, at the STB 103, of the stored content data 111b respective to programming preferences as detailed via channel map data. In addition, the kiosk module 207 enables the STB 103 to respond to various user commands and interactions based on the simulated connection to the head-end, including enabling users to select a particular channel for enabling viewing/accessing of programming, launching games or widgets, viewing content descriptions, enabling video-on-demand features or other STB 103 capability.

It is noted that the kiosk module 207 relays the control signal data 111a and content data 111b to the STB 103 for enabling STB 103 execution, but does not execute the various functions of the STB 103. Rather, the kiosk module 207 provides an interface to the required control signal data 111a for enabling operation of the STB 103, and the STB 103 then executes the various functions and features associated with its implementation. More regarding the exemplary implementation of the STB 103 is described later on with respect to FIG. 5. By way of example, when a request for access to a specific channel is requested, the channel map data, timing data, and dynamic data is presented to the STB 103 by the kiosk module 207 to support playback of content data 111b by the STB 103 in accordance with the proper time and/or channel selection. Hence, the kiosk module 207 matches the current time at which a request is received to the program/content time slot data as indicated via the channel map data; enabling the execution of content on the STB 103 to be carried out seamlessly.

As noted, playback of the stored content data 111b in the absence of head-end connectivity is limited to that which was previously recorded such as via a DVR, or that was downloaded as content data 111b. The extent of playback of the content data 111b by the STB 103 or playback application 127 is therefore also dependent on the timing information—i.e., last recorded time of accessing of the head-end control signals. As such, the STB 103 or playback application 127 can only playback content that occurred X hours before or after the timestamp.

In certain embodiments, the connection detection module 209 determines whether or not a current connection to the head-end is available and feeds this information to the kiosk module 207. When a connection is determined—i.e., specific control signal data 111a is available—the kiosk module 207 remains inactive (head-end simulation process not invoked) while the data caching module 205 actively stores/caches data (on the basis of predetermined schedule). When no connection is determined, however, the kiosk module 207 is activated (head-end simulation process invoked) while the data caching module 205 is set to inactive. As noted previously, the connection detection module 209 may employ various signal verification techniques, dielectric connectivity detection techniques, and other methods relative to the various interfaces and connectors to the STB 103.

In one embodiment, a communication interface 213 enables formation of a session over a network 107 between the simulation platform 101 and/or the set-top box 103 and the playback application 127. This may include execution of various protocols and data sharing techniques for enabling collaborative execution between respective devices operating the playback application 127 and the platform 101 over networks 105 or 107 for receiving a request for access to the set-top box 103. Request authorization may be regulated by the authentication module 203 as it operates in connection with the interface 213; the request being based on the user profile data 215. It is noted that the communication interface 213, therefore, supports on-the-go accessibility to the features and/or operation of the set-top box 103 in the absence of head-end connectivity of the STB, of the requesting device, or a combination thereof.

Also, in one embodiment, a control module 211 is configured to regulate the communication processes between the various other modules for simulating a connection to a head-end system to enable execution of content and features of a set-top box. For example, the controller module 211 generates the appropriate signals to control the communication interface 213 for facilitating transmission of data over the network 107. Also, while not shown, the controller module 211 may access various monitoring systems for regulating operation of the simulation platform 101. This may include systems for detecting current data traffic levels, error conditions, data exchange rates, network latencies, resource allocation levels and other conditions associated with the operation of the platform 101, such as to ensure its effective use respective to a calling playback application 127.

While specific reference will be made to the above described implementation, it is also contemplated that platform 101 may embody many forms and include multiple and/or alternative components. For example, the components of platform 101 may be combined, located in separate structures, and/or separate locations. By way of example, platform 101 may be implemented in accordance with a cloud-based server implementation or as a hosted solution provisioned by a service provider. As another example, several of the components of the platform 101 may be integrated within a set-top box 103 for communication with various other components of the platform. In certain embodiments, a control module 211 regulates the execution and interaction of the various components of the platform 101 accordingly.

FIGS. 3A-3D are flowcharts of processes for simulating a connection to a head-end system to enable execution of content and features of a set-top box, according to various embodiments. For the purpose of illustration, the processes are described with respect to FIG. 1. It is noted that the steps of the process may be performed in any suitable order, as well as combined or separated in any suitable manner.

In step 301 of process 300, the simulation platform 101 stores, in association with a set-top box, a plurality of control data signals associated with a head-end system. As mentioned, the control data signals 111a may include timing information, dynamic data and channel map data. In another step 303, the platform 101 determines a loss of connectivity to the head-end system 125, such as due to improper configuration to the set-top box, a faulty coaxial cable, etc. Per step 305, a head-end simulation process is invoked by the simulation platform 101 in response to the determination. The head-end simulation process, which is activated based on the presence of the control signal data, facilitates operation of the set-top box, execution of a feature of the set-top box, or a combination thereof.

In step 307 of process 306 (FIG. 3B), the platform 101 receives an input signal for executing a feature of the set-top box. Features may include the selecting of a channel, the launching of a programming guide, the activating of video-on-demand, the activating of a widget, the playing of a video game, etc. In certain embodiments, the input signal may be provided by way of a remote control device, manual input and data entry, or a playback application 127. In another step 309, the platform 101 associates the input signal with stored content associated with the set-top box based on one or more of the control data signals. Per step 311, playback of the stored content and/or execution of the feature of the set-top box is initiated by the platform 101 based on the association.

In step 313 of process 312 (FIG. 3C), the platform 101 determines a match between a current time, the timing information and/or the channel map data. In another step 315, the platform 101 determines a relationship between a feature as requested for execution, the dynamic data and/or the input signal. With regard to steps 313 and 315, by way of example, consider a scenario wherein a user wishes to view a cooking show whose corresponding time slot on the channel map is 2 PM to 3 PM. The user may initiate the process of retrieving the appropriate content data 111b pertaining to the show by activating a feature of the set-top box 103 for selecting the appropriate channel. The simulation platform 101 also notes the current active time of request for the channel as 2:34 PM. Using the timing information and current time data as a reference, the platform 101 is able to retrieve only the content data 111b that relates to the show in question and that corresponds to the elapsed period of time since the show was scheduled to begin (e.g., from 2:34 PM to 3:00 PM). This execution corresponds to step 317, wherein the platform 101 selects stored content for playback based on the match and/or the relationship.

In another step 319 of process 318 (FIG. 3D), the platform 101 receives a request over a network 105 and/or network 107 for access to the set-top box 103 from a device associated with a user of the set-top box 103. This corresponds to on-the-go execution of the features of the set-top box 103, as initiated by a playback application 127 operable by the device. As mentioned previously, the platform 101 may execute an authentication process for ensuring proper accessibility of the device to the set-top box 103 or features thereof. The playback application 127, in certain embodiments, presents an interface for depicting a display to the features of the set-top box 103. This may include, for example, a television display, channel selection buttons, volume buttons, menu selection buttons and other features corresponding to operation of the set-top box 103. It is noted that the device running the playback application 127 need not be within physical proximity of the set-top box 103, nor does the set-top box need to be presently configured to the head-end 125, to support execution of content and set-top box features.

The above processes and associated arrangement, in certain embodiments, advantageously permits viewers to continue experiencing a program, even though connectivity to the head-end system 125 may be lost. By contrast, traditional systems do not provide any such capability, resulting in disruption of service. Such disruption can negatively impact viewership (which, beyond mere inconvenience to the viewers, can result in diminished effectiveness of advertisements for the broadcast systems 123). Further, the service provider, which is responsible for service and maintaining the set-top boxes, may lose subscribers, and thus, revenue.

Figure 4:
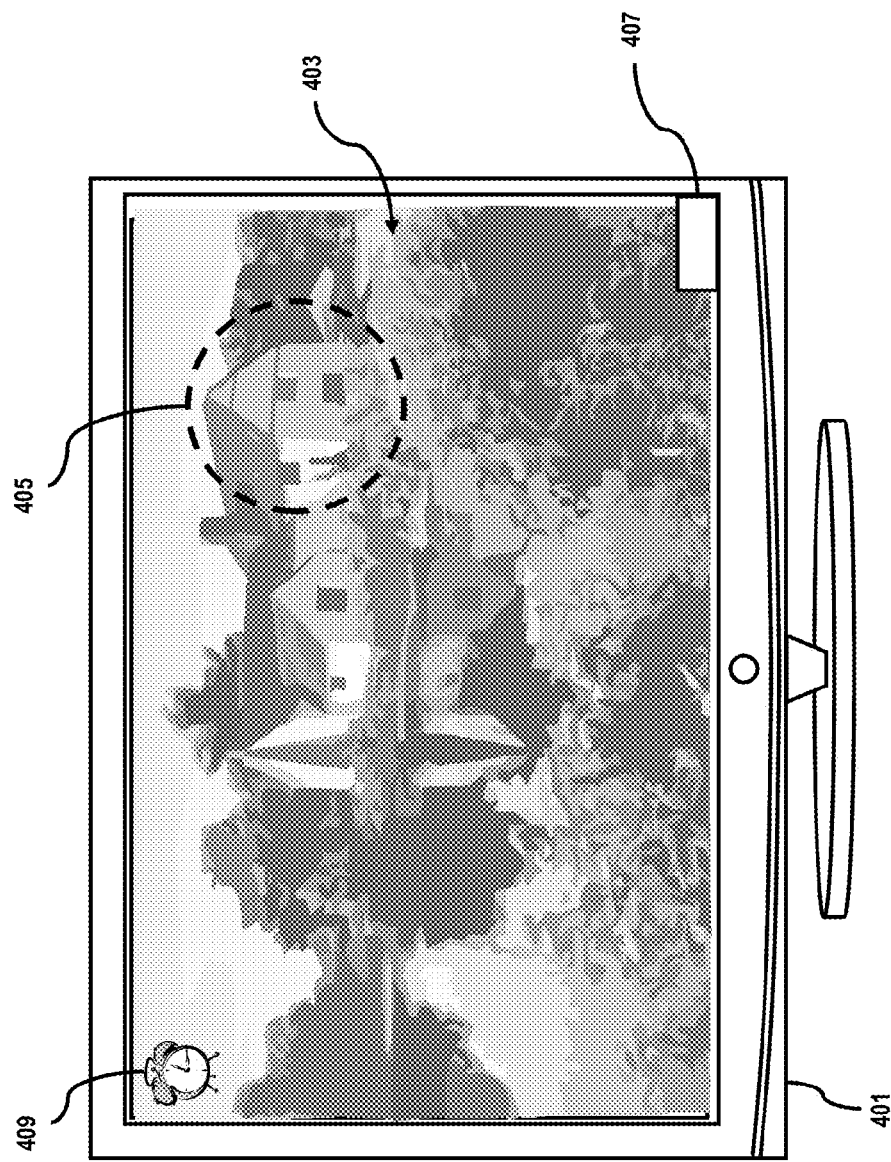
FIGS. 4-6 are diagrams of a display for enabling execution of content and features of a set-top box based on simulated connectivity to a head-end system, according to various embodiments.
Figure 5:
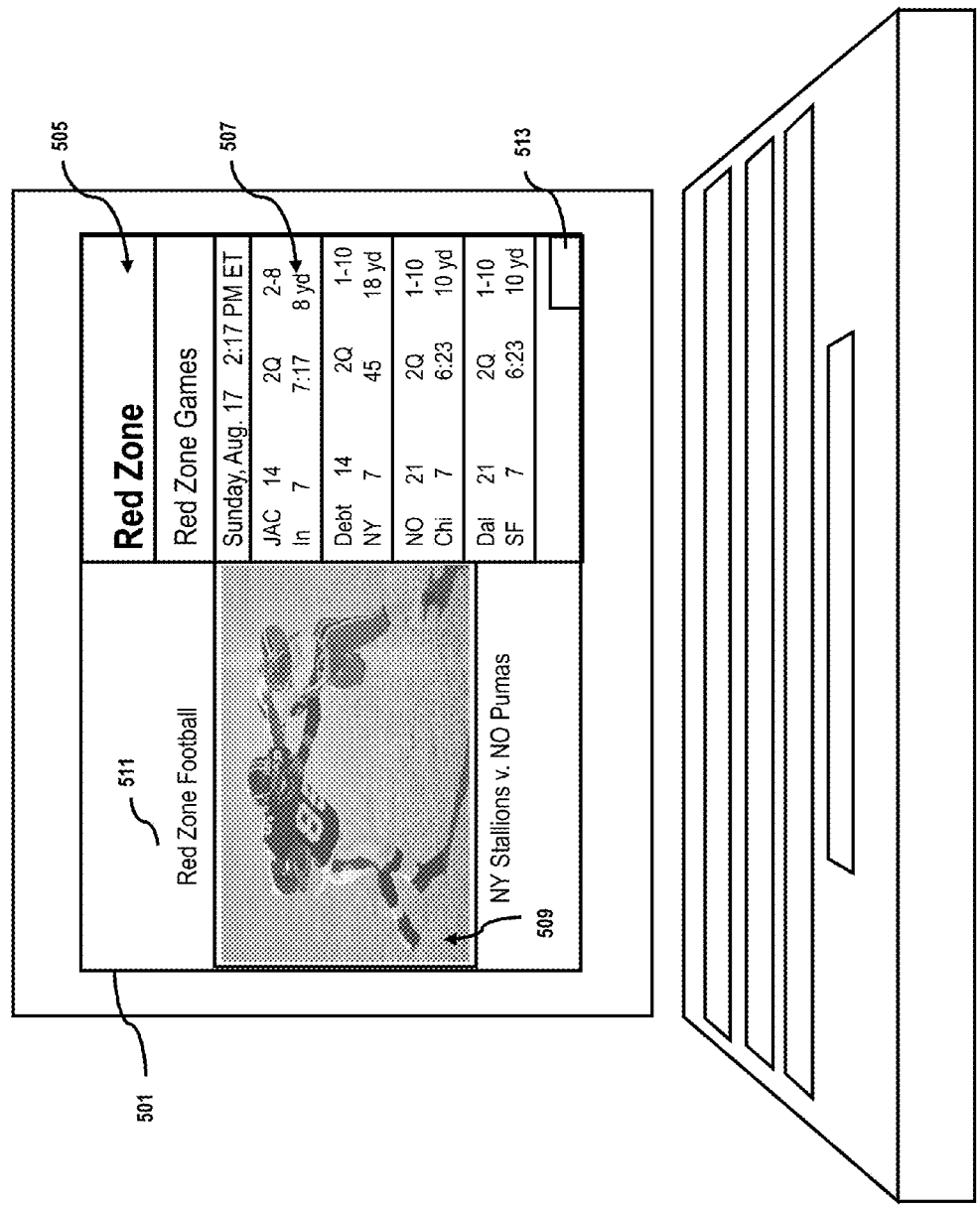
Figure 6:
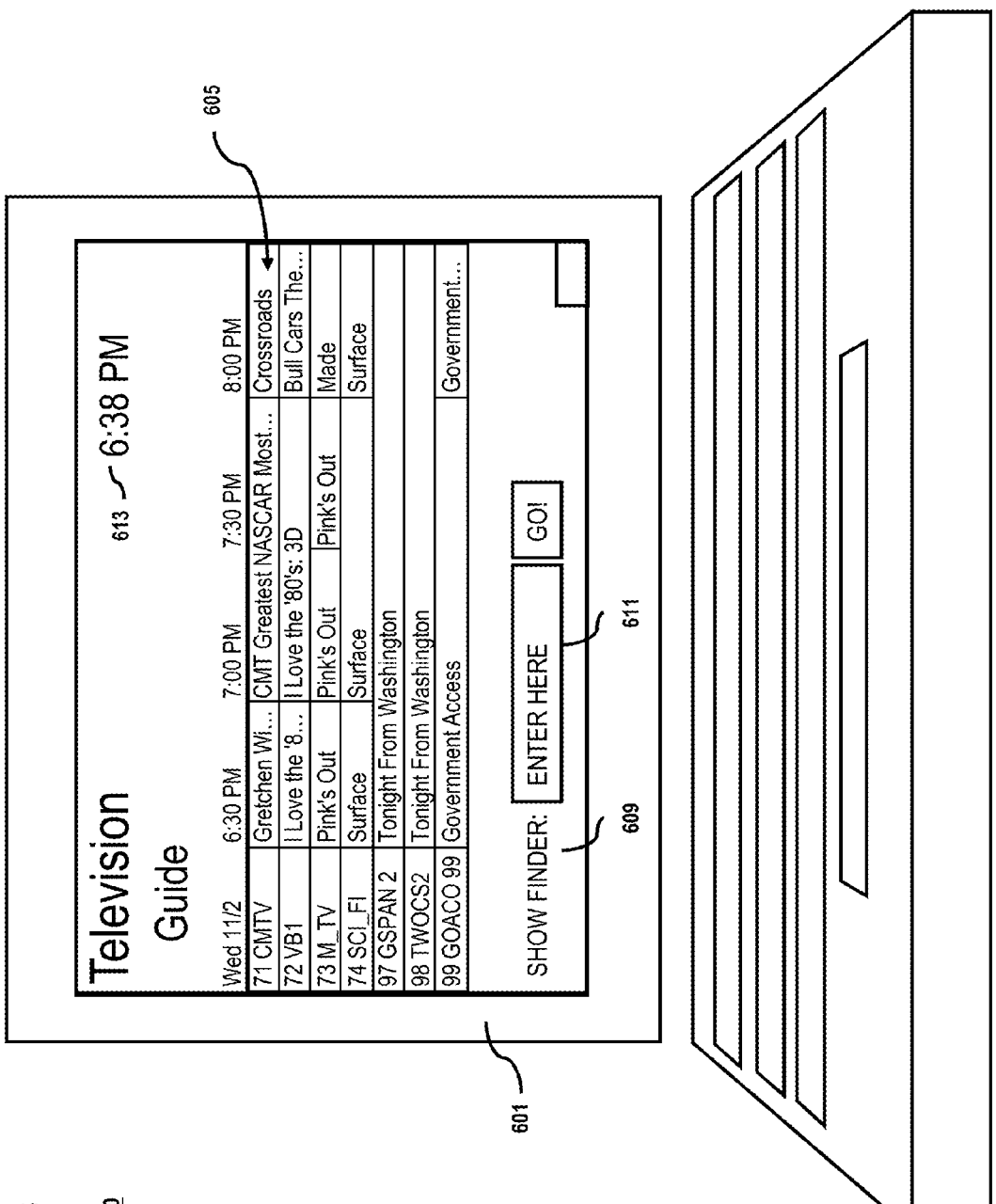

FIGS. 4-6 are diagrams of a display for enabling execution of content and features of a set-top box based on simulated connectivity to a head-end system, according to various embodiments. For example purposes, the diagrams are presented from the perspective of the exemplary system 100 of FIG. 1. A display associated with a set-top box 103 that is not connected to a head-end system 125 presents content data 403 via a display 401 to a user/viewer. Operation of the STB 103 is therefore enabled by way of the simulation platform 101 based on accesses to the required control signal data 111A for enabling the simulation.

The content data 111b may include broadcasted, televised, pre-recorded, live, streaming media or other content data as provided by way of a media service provider 119. In addition, the content data 111b includes interactive content 405—i.e., content embedded within or associated with the televised, broadcasted or otherwise presented content data for invoking additional actions and features with respect to the content 403/405. The simulation platform 101 enables the set-top box 103 to gain access to the stored content data 111b for supporting execution of content. Hence, content data 403 is presented along with various widgets, including a menu or control panel widget 407 and a time widget 409. The menu or control panel widget 407, when activated by user touch, remote control, or other input means invokes presentment of a menu or control panel that features various control functions of the set-top box 103 relative to the content 403. The time widget 409, which is positioned atop content 403, presents the current time. As mentioned, execution of the widgets may be supported by way of the dynamic data as stored in the control signal database 111a, and thus made available to the set-top box 103.

In FIG. 5, a display 501 of a user device 500 operating a playback application for remotely accessing the features of a set-top box is shown. The playback application 127 supports on-the-go execution of the features of a set-top box 103 as facilitated by way of a request process handled by the simulation platform. Fulfillment of the request permits the user device 500 to access the set-top box, or at least execute the features of the set-top box and playback content data. By way of example, the content data 505 is divided into various frames of content, including a football scoreboard (section 507), a current game being played between opposing teams (section 509), a section for specifying the current channel and title of the broadcasted content data 511, etc. It is noted the content as presented in this example, featuring the various sections or frames of content, may be invoked for presentment by activation of the menu or control panel widget 513. Furthermore, it is noted that the playback application 127 enables the same essential capabilities of the set-top box to be performed regardless of the proximity of the device 500 to the set-top box or the connectivity of the set-top box 103 to the head-end system 125.

In FIG. 6, a television guide widget 605 is presented as content to the touchable display 601 of a laptop device 600. As before, the laptop 600 is authorized to engage with the STB for on-the-go execution of its functions and features by way of a playback application 127. Thus, as the laptop 600 is not itself configured as a set-top box 103 to the head-end system 125, the simulation platform 101 enables remote simulation modes to be invoked. In this manner, the user may provide various inputs at the touchable display 601 of the laptop device 600 for interacting with the widget 605, including permitting entry of search criteria to a show finder widget 609. Search capability is made possible by comparing a text string entered into a text entry field 611 to the stored programming and content data maintained in association with the set-top box, i.e., by the simulation platform 101. In addition, current time data, such as presented by way of a digital clock widget 613 may be used as reference data for matching or comparing against time slot information maintained per the channel map data. By way of this comparison or matching process, only the most relevant stored content data per the widget 605 is presented to the user. Still further, input provided to the simulation platform 101 based on the selection of a particular program or channel by the user, may be used as criteria for retrieving the appropriate content data 111b.

As mentioned previously, the extent to which playback of content data is possible depends on the last recorded time of accessing of the head-end control signals. Hence, in certain embodiments, the simulation platform 101 can limit the playback of content to that occurring before the timestamp (timing information), such as in instances where the fetching of content ahead of the timestamp is not possible. The extent to which content may be retrieved and subsequently stored during the time of set-top box to head-end connectivity may vary from one user to another depending on subscription details and other factors. In addition, the buffer capacity of the platform 101 as it operates in connection with a set-top box for caching of content data may also affect the amount of programming capable of being stored. A message may be presented to the display in cases where no content is able to be played back in instances where content is not available for a selected time frame or channel. Alternatively, the user may be presented with the option of executing a different program (content data) or channel at that time as stored in the content database 111.

Figure 7:
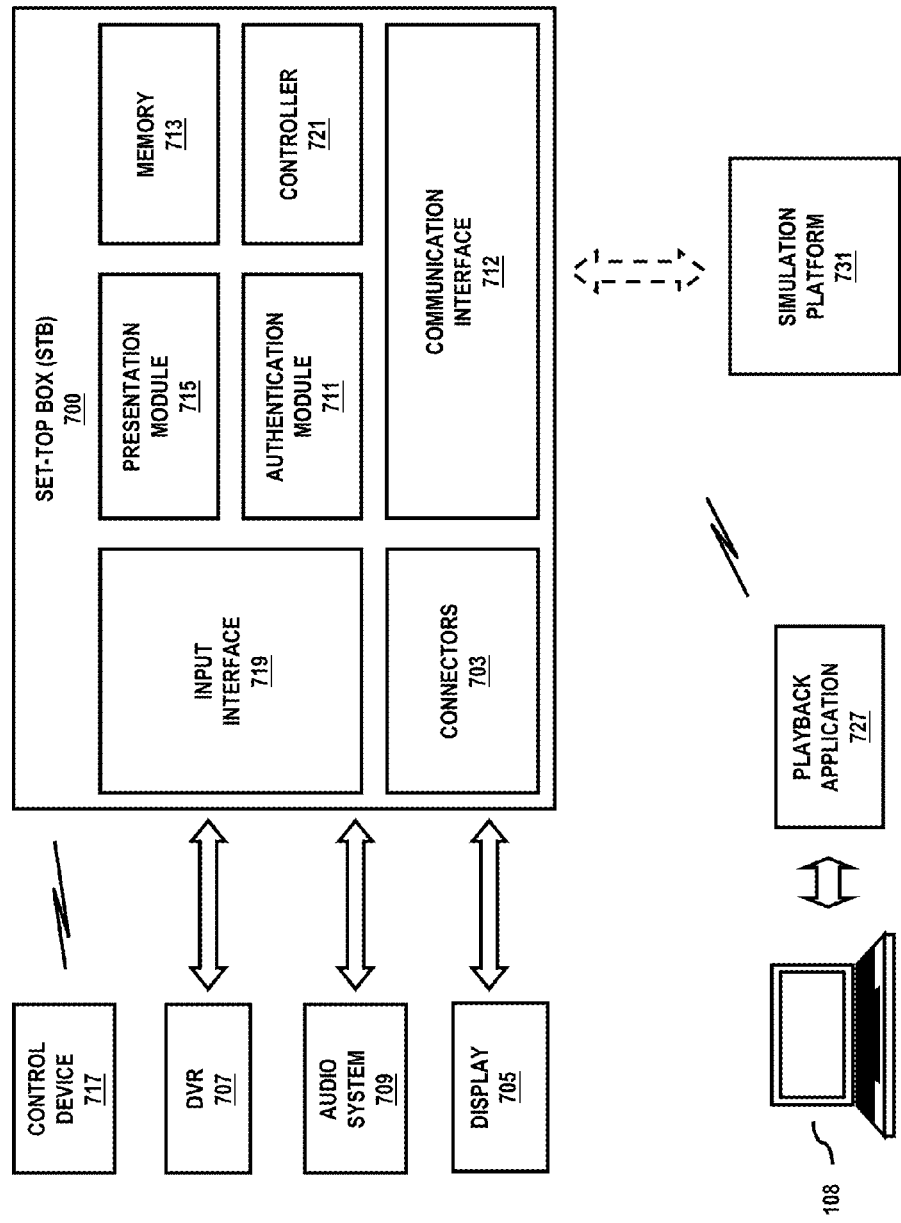
FIG. 7 is a diagram of a set-top box capable of operating in connection with the simulation platform of FIG. 2, according to one embodiment.

FIG. 7 is a diagram of a set-top box capable of operating in connection with the simulation platform of FIG. 2, according to one embodiment. The set-top box 700 may utilize any suitable technology to receive one or more content streams from a media source, such as MSP 119 and one or more third-party content provider systems 121. The content streams include content data retrieved over one or more data networks (e.g., networks 105 and/or 107), in response to commands from one or more media applications, i.e., playback application 727.

According to various embodiments, device 700 may also include inputs/outputs (e.g., connectors 703) to a display 705 and DVR 707, as well as to audio system 709. In particular, audio system 709 may comprise a conventional audio-video receiver capable of monaural or stereo sound, as well as multichannel surround sound. Audio system 709 may include speakers, ear buds, headphones, or any other suitable component configured for personal or public dissemination. As such, set-top box 700, display 705, DVR 707, and audio system 709, for example, may support high resolution audio and/or video streams, such as high definition television (HDTV) or digital theater systems high definition (DTS-HD) audio. Thus, set-top box 900 may be configured to encapsulate data into a proper format with required credentials before transmitting onto one or more of the networks of FIG. 1 and de-encapsulate incoming traffic to dispatch data to display 705 and/or audio system 709. In addition, the set-top box may permit the embedding or overlay of dynamic content data in connection with television or broadcast content data.

In an exemplary embodiment, display 705 and/or audio system 709 may be configured with internet protocol (IP) capability (i.e., includes an IP stack, or is otherwise network addressable), such that the functions of set-top box 700 may be assumed by display 705 and/or audio system 709. In this manner, an IP ready, HDTV display or DTS-HD audio system may be directly connected to one or more service provider networks 105 and/or communication networks 107. Although set-top box 700, display 705, DVR 707, and audio system 709 are shown separately, it is contemplated that these components may be integrated into a single component, or other combination of components. Pursuant to this integration, the simulation platform 731 may also be integrated within the set-top box 700 or accessed by it to enable control of the display 705, DVR 707, and audio system 709 relative to the head-end simulation process.

An authentication module 711 may be provided by set-top box 700 to initiate or respond to authentication schemes of, for instance, service provider network 105, third-party content provider systems 121, or various other content providers, e.g., television broadcast systems 123, etc. Authentication module 711 may provide sufficient authentication information, e.g., a user name and password, a key access number, a unique machine identifier (e.g., MAC address), and the like, as well as combinations thereof, to a corresponding communications (or network) interface 712 for establishing connectivity, via LAN 117, and to seamless viewing platform 701. Authentication at set-top box 700 may identify and authenticate a second device (e.g., computing device 108) communicatively coupled to, or associated with the set-top box 700, or vice versa. Further, authentication information may be stored locally at memory 713, in a repository (not shown) connected to set-top box 900, or at a remote repository (e.g., user profile repository 215) as maintained by the simulation platform 731. As noted previously, on-the-go access to the features of the set-top-box 700 is facilitated by the communication interface 712 and authentication module 711 as it engages the playback application 727.

Authentication module 711 may also facilitate the reception of data from single or disparate sources. For instance, set-top box 700 may receive broadcast video from a first source (e.g., MSP 119), signals from a media application at second source (e.g., computing device 115), and a content data stream from a third source accessible over communication networks 107 (e.g., third-party content provider system 121). As such, display 705 may present the broadcast video, media application, and content data stream to the user, wherein set-top box 700 (in conjunction with one or more media applications) can permit users to experience various sources of content data traditionally limited to the data domains. This presentation may be experienced separately, concurrently, in a toggled fashion, or with zooming, maximizing, minimizing, or trick capabilities, or equivalent mode. Such capability may be performed even in the absence of head-end connectivity by way of the simulation platform, i.e., given the availability of stored control signal data and content data. In other exemplary embodiments, authentication module 711 can authenticate a user to allow them to interact with one or more third-party subscriber account features associated with third-party content provider systems 121.

Presentation module 715 may be configured to receive content data streams (e.g., audio/video feed(s) including content data retrieved over a data network) and output a result via one or more connectors 703 to display 705 and/or audio system 709. In this manner, presentation module 715 may also provide a user interface for a media application via display 705. Aural aspects of media applications may be presented via audio system 709 and/or display 705. In certain embodiments, media applications, such as media manager 701, may be overlaid on the video content output 707 of display 705 via presentation module 715. The content data streams may include content received in response to user input specifying content that is accessible by way of one or more third party content provider systems 105 and, thereby, available over at least one data network (e.g., network 105 and/or 107), wherein the content data may be retrieved and streamed by set-top box 700 for presentation via display 705 and/or audio system 709. Accordingly, presentation module 715 may be configured to provide lists of search results and/or identifiers to users for selection of content data to be experienced. Exemplary search results and/or identifiers may include graphical elements, channels, aural notices, or any other signifier, such as a uniform resource locator (URL), phone number, serial number, registration number, MAC address, code, etc. The above described search capability, selective streaming of content and other features are simulated by the platform 731 as connectivity to the head-end system is lost.

Connector(s) 703 may provide various physical interfaces to display 705, audio system 709, as well as other peripherals such as the head-end system. The physical interfaces may include, for example, RJ45, RJ11, high definition multimedia interface (HDMI), optical, coax, FireWire, wireless, and universal serial bus (USB), or any other suitable connector. The simulation platform 731 may be configured to employ signal detection techniques relative to the connectors 703 for determining the connectivity of the set-top box 700 to a head-end system.

The presentation module 715 may also interact with a control device 717 for determining particular content data that a user desires to experience. In an exemplary embodiment, control device 717 may comprise a remote control (or other access device having control capability (e.g., computing device 115), a wireless user device, mobile phone, etc.) that provides users with the ability to readily manipulate and dynamically modify parameters affecting the content data being viewed. In other examples, set-top box 700 may be configured for voice recognition such that set-top box 700 may be controlled with spoken utterances. All of these capabilities may be facilitated as well by way of a playback application 727 having the appropriate instructions and application interfaces for controlling the set-top box 700.

In this manner, control device 717 may include (not shown) a cursor controller, trackball, touch screen, touch pad, keyboard, and/or a key pad for activating a media application, navigating through broadcast channels, search results, and/or content data identifiers, as well as performing other control functions. For instance, control device 717 may be utilized to maximize a media application, navigate through displayable interfaces, locate/specify/retrieve content data, modify set-top box 700 parameters, or toggle through broadcast channels and/or content data identifiers. Control device 717 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like. These functions may be further integrated for use within the media application associated with the playback application 727.

Input interface 719 may support any type of wired and/or wireless link, e.g., infrared, radio frequency (RF), BLUETOOTH, and the like. Thus, control device 717 may store user preferences with respect to content data, such as favorite sources, etc. Alternatively, user preferences may be tracked, recorded, or stored at set-top box 70 or at a network user profile repository 111. The preferences may be automatically retrieved and activated by a user at any time. It is noted that control device 717 may be separate from set-top box 700 or may be integrated within set-top box 700, in which case certain input interface hardware and/or software may be superfluous.

Particular embodiments enable users, via control device 717, to populate or otherwise configure a user profile. For instance, a user profile application may be provided or accessed by set-top box 700 to enable users to populate various entry fields with user information. A user profile may include one or more customized or personalized settings that affect any aspect of content data accessible via set-top box 700. More specifically, the profile may include: information relating to the simulation feature of the set-top box, subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible content data sources/subjects, a "blacklist" specifying one or more content data sources/subjects, as well as other equivalent customized settings, such as color schemes, sound effects, etc.

In other embodiments, the user profile may be established using the additional access devices described earlier (e.g., computing device 115, etc.) or via the simulation platform 731. As such, user profile information may be stored at set-top box 700, e.g., at memory 713, and/or at the simulation platform 731. Additionally or alternatively, profile information may be stored in a network-based repository (e.g., remote user profile repository), control device 717, and/or any other storage medium. Similarly, set-top box 700 may store a collection of digital audio, video and/or image content accumulated by a user—i.e., by way of dynamic content data. This collection may also include identifiers, links, search results, or bookmarks to content data accessible by way of the content data as stored.

It is noted, in the foregoing discussion of FIG. 7, that references to the set-top box accessing the various service providers (e.g., MSP 119) via the network pertains to instances of determined connectivity to the head-end system. When such connectivity is lost or not available, however, the same executions are simulated by virtue of the stored control signal data and content data maintained by the simulation platform 731. The exemplary techniques and system presented herein enable normal operation of a set-top box as described regardless of the state of connectivity of the set-top box to a head-end system.

The processes described herein for simulating a connection to a head-end system to enable execution of content and features of a set-top box may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
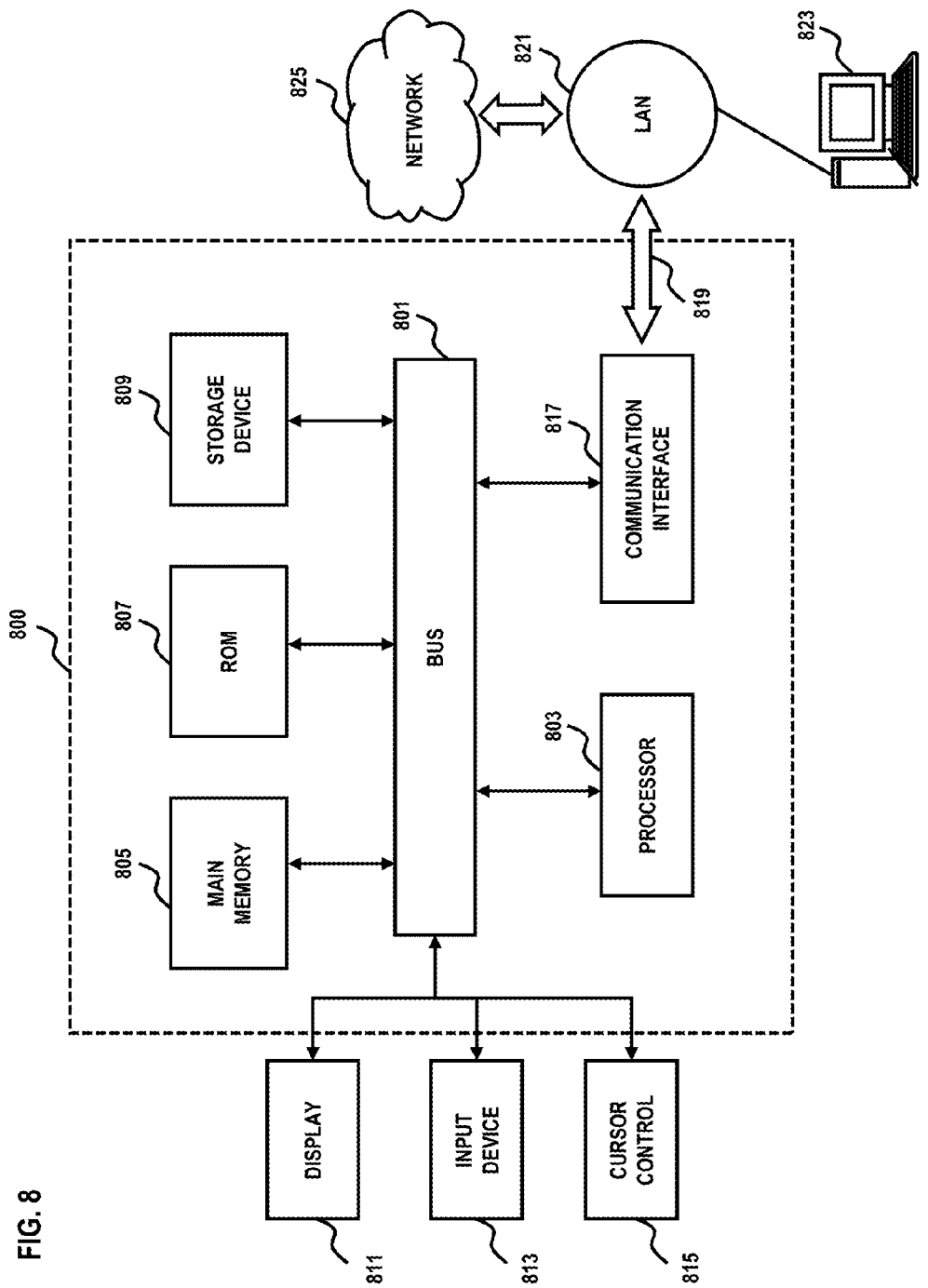
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
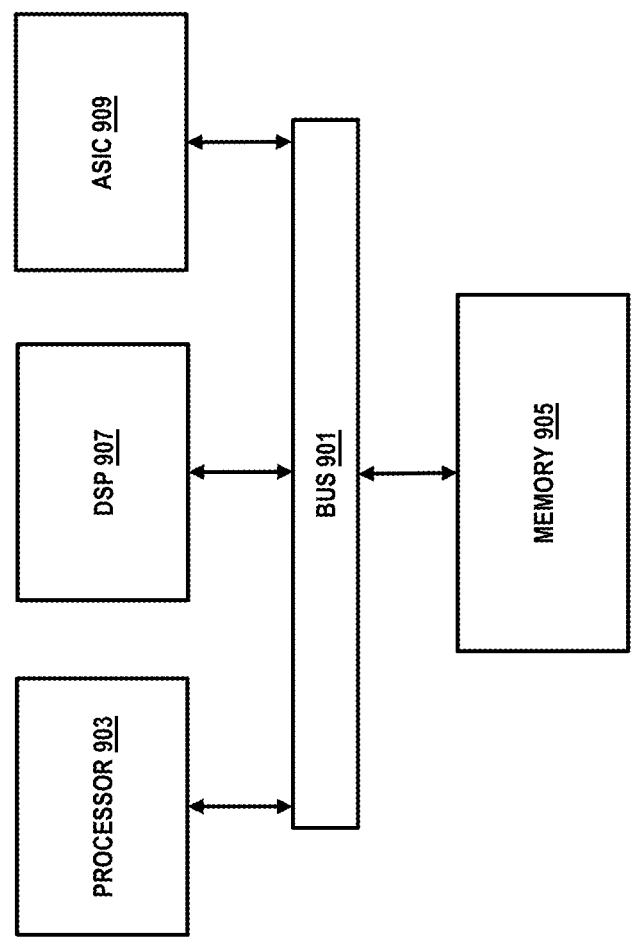
FIG. 9 is a diagram of a chip set that can be used to implement an embodiment of the invention.

FIG. 9 illustrates a chip set or chip 900 upon which an embodiment of the invention may be implemented. Chip set 900 is programmed to simulate a connection to a head-end system to enable execution of content and features of a set-top box as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of simulating a connection to a head-end system to enable execution of content and features of a set-top box.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to simulate a connection to a head-end system to enable execution of content and features of a set-top box. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
storing at a simulation platform, in association with a set-top box, a plurality of control data signals associated with a head-end system, the plurality of control data signals indicating a connection of the set-top box to the head-end system;
determining loss of connectivity of the set-top box to the head-end system; and
invoking a head-end simulation process at the simulation platform, in response to the determination, using the plurality of control data signals that are stored,
wherein the plurality of control data signals include timing information, dynamic data, and channel map data,
wherein the plurality of control data signals are stored at the simulation platform and time stamped during periods of scheduled storing when connectivity of the set-top box to the head-end is active,
wherein, at a time the head-end simulation process is invoked, the head-end simulation process provides the plurality of control data signals to the set-top box to mimic connectivity of the set-top box to the head-end, and
wherein, during the head-end simulation process, the set-top box executes various set-top functions using the plurality of control data signals that have been provided by the simulation platform.

2. A method of claim 1, further comprising:
receiving an input signal for executing a feature of the set-top box;
associating the input signal with stored content associated with the set-top box based on one or more of the control data signals; and
initiating playback of the stored content, execution of the feature, or a combination thereof by the set-top box based on the association.

3. A method of claim 2, wherein the feature is associated with the selecting of a channel, the launching of a programming guide, the activating of video-on-demand, the activating of a widget, the playing of a video game, or a combination thereof.

4. A method of claim 2, further comprising:
   determining a match between a current time, the timing information, the channel map data, or a combination thereof;
   determining a relationship between the feature, the dynamic data, the input signal, or a combination thereof; and
   selecting stored content for playback based on the match, the relationship, or a combination thereof.

5. A method of claim 2, further comprising:
   receiving a request over a communication network for access to the set-top box from a device related to a user of the set-top box.

6. A method of claim 5, wherein the device operates a playback application capable of generating an input signal for executing a feature of the set-top box.

7. A method of claim 1, wherein the head-end simulation process facilitates the operation of the set-top box, execution of a feature of the set-top box, or a combination thereof.

8. An apparatus comprising:
   at least one processor; and
   at least one memory including computer program code for one or more programs,
   the at least one memory and the computer program code configured to, with the at least one processor, cause the apparatus to perform at least the following,
      store at a simulation platform, in association with a set-top box, a plurality of control data signals associated with a head-end system, the plurality of control data signals indicating a connection of the set-top box to the head-end system,
      determine loss of connectivity of the set-top box to the head-end system, and
      invoke a head-end simulation process at the simulation platform, in response to the determination, using the plurality of control data signals that are stored,
      wherein the plurality of control data signals include timing information, dynamic data, and channel map data,
      wherein the plurality of control data signals are stored at the simulation platform and time stamped during periods of scheduled storing when connectivity of the set-top box to the head-end is active,
      wherein, at a time the head-end simulation process is invoked, the head-end simulation process provides the plurality of control data signals to the set-top box to mimic connectivity of the set-top box to the head-end, and
      wherein, during the head-end simulation process, the set-top box executes various set-top functions using the plurality of control data signals that have been provided by the simulation platform.

9. An apparatus of claim 8, wherein the apparatus is further caused to:
   receive an input signal for executing a feature of the set-top box;
   associate the input signal with stored content associated with the set-top box based on one or more of the control data signals; and
   initiate playback of the stored content, execution of the feature, or a combination thereof by the set-top box based on the association.

10. An apparatus of claim 9, wherein the feature is associated with the selecting of a channel, the launching of a programming guide, the activating of video-on-demand, the activating of a widget, the playing of a video game, or a combination thereof.

11. An apparatus of claim 9, wherein the apparatus is further caused to:
   determine a match between a current time, the timing information, the channel map data, or a combination thereof;
   determine a relationship between the feature, the dynamic data, the input signal, or a combination thereof; and
   select stored content for playback based on the match, the relationship, or a combination thereof.

12. An apparatus of claim 9, wherein the apparatus is further caused to:
   receive a request over a communication network for access to the set-top box from a device related to a user of the set-top box.

13. An apparatus of claim 12, wherein the device operates a playback application capable of generating an input signal for executing a feature of the set-top box.

14. An apparatus of claim 8, wherein the head-end simulation process facilitates the operation of the set-top box, execution of a feature of the set-top box, or a combination thereof.

15. A system comprising:
   a simulation platform configured to store, in association with a set-top box, a plurality of control data signals associated with a head-end system, the plurality of control data signals indicating a connection of the set-top box to the head-end system,
   wherein the simulation platform is further configured to determine loss of connectivity of the set-top box to the head-end system, and to invoke a head-end simulation process, in response to the determination, using the control data signals that are stored,
   wherein the control data signals include timing information, dynamic data, and channel map data,
   wherein the plurality of control data signals are stored and time stamped during periods of scheduled storing when connectivity of the set-top box to the head-end is active,
   wherein, at a time the head-end simulation process is invoked, the head-end simulation process provides the plurality of control data signals to the set-top box to mimic connectivity of the set-top box to the head-end,
   wherein the simulation platform is still further configured to receive a request over a communication network for access to the set-top box from a device related to a user of the set-top box, and the device operates a playback application capable of generating an input signal for executing a feature of the set-top box, and
   wherein, during the head-end simulation process, the set-top box executes various set-top functions using the plurality of control data signals that have been provided by simulation platform.

16. A system of claim 15, wherein the simulation platform is further configured to:
   receive the input signal for executing a feature of the set-top box;
   associate the input signal with stored content associated with the set-top box based on one or more of the control data signals; and
   initiate playback of the stored content, execution of the feature, or a combination thereof by the set-top box based on the association.

17. A system of claim 16, wherein the feature is associated with the selecting of a channel, the launching of a programming guide, the activating of video-on-demand, the activating of a widget, the playing of a video game, or a combination thereof.

18. A system of claim 16, wherein the simulation platform is further configured to:
  determine a match between a current time, the timing information, the channel map data, or a combination thereof;
  determine a relationship between the feature, the dynamic data, the input signal, or a combination thereof; and
  select stored content for playback based on the match, the relationship, or a combination thereof.

19. A system of claim 15, wherein the head-end simulation process facilitates the operation of the set-top box, execution of a feature of the set-top box, or a combination thereof.

* * * * *